(12) United States Patent
Le Quere Dumont et al.

(10) Patent No.: US 11,274,726 B2
(45) Date of Patent: Mar. 15, 2022

(54) HYDROELASTIC DEVICE COMPRISING A LOCKING SYSTEM

(71) Applicant: ANVIS HOLDING, Epinal (FR)

(72) Inventors: Patrice Le Quere Dumont, Guerigny (FR); Patrice Fort, Thouare sur Loire (FR)

(73) Assignee: ANVIS HOLDING, Epinal (FR)

( * ) Notice: Subject to any disclaimer, the term of this patent is extended or adjusted under 35 U.S.C. 154(b) by 224 days.

(21) Appl. No.: 16/610,652

(22) PCT Filed: Mar. 26, 2018

(86) PCT No.: PCT/FR2018/050725
§ 371 (c)(1),
(2) Date: Nov. 4, 2019

(87) PCT Pub. No.: WO2018/202967
PCT Pub. Date: Nov. 8, 2018

(65) Prior Publication Data
US 2020/0063822 A1    Feb. 27, 2020

(30) Foreign Application Priority Data

May 4, 2017    (FR) ...................... 1753953

(51) Int. Cl.
*F16F 13/14*    (2006.01)
*F16F 1/387*    (2006.01)

(52) U.S. Cl.
CPC ...... *F16F 13/1481* (2013.01); *F16F 13/1463* (2013.01); *B60G 2204/41062* (2013.01);
(Continued)

(58) Field of Classification Search
CPC .... F16F 13/1481; F16F 13/1403; F16F 1/387; F16F 13/1409; F16F 2230/24; B60G 2204/41062
See application file for complete search history.

(56) References Cited

U.S. PATENT DOCUMENTS 3,642,268 A    2/1972   Hipsher
3,883,126 A *  5/1975   Nicholls ............... F16F 9/0254
                                                    267/64.12
(Continued)

FOREIGN PATENT DOCUMENTS

DE    196 51 138 A1    6/1997
EP    0 234 966 A1     9/1987
(Continued)

OTHER PUBLICATIONS

International Search Report dated Jul. 24, 2018, in corresponding PCT application PCT/FR2018/050725.

*Primary Examiner* — Melanie Torres Williams
(74) *Attorney, Agent, or Firm* — Nixon & Vanderhye

(57) ABSTRACT

The device includes solid force transmission elements including two reinforcements, a damping body, a damping space including a damping chamber, the device being normally in a filling state where the damping space is filled with a damping liquid and may accidentally be in a state of loss of filling, which has an integrated element, specific and proprietary, palliative for the loss of filling, inactive in the state of filling and made active in the state of loss of filling where they bring the hydroelastic device to a state of stiffness of a high level, such element including a locking system including a locking part, integrally rigid, and a deformable load part controlled by the state of the device with respect to filling.

23 Claims, 3 Drawing Sheets

(52) U.S. Cl.
CPC ........... *F16F 1/387* (2013.01); *F16F 13/1409* (2013.01); *F16F 2230/24* (2013.01)

(56) References Cited

U.S. PATENT DOCUMENTS

| | | | |
|---|---|---|---|
| 4,449,702 A * | 5/1984 | Hasegawa | E05C 17/30 |
| | | | 188/300 |
| 4,682,753 A | 7/1987 | Clark | |
| 4,690,388 A * | 9/1987 | Harrison | B60G 7/04 |
| | | | 267/35 |
| 4,741,521 A | 5/1988 | Schiffner et al. | |
| 4,768,760 A | 9/1988 | Le Fol | |
| 4,840,357 A | 6/1989 | Jouade | |
| 4,875,664 A | 10/1989 | Moore | |
| 4,899,997 A | 2/1990 | Thorn | |
| 4,905,956 A * | 3/1990 | Zemlicka | B60K 5/1291 |
| | | | 248/562 |
| 5,024,425 A | 6/1991 | Schwerdt | |
| 5,123,634 A | 6/1992 | Schwerdt | |
| 5,613,668 A | 3/1997 | Brunerye | |
| 5,957,439 A | 9/1999 | Bellamy et al. | |
| 6,102,378 A | 8/2000 | Gieseler et al. | |
| 6,168,144 B1 | 1/2001 | Bruehl | |
| 6,622,996 B2 | 9/2003 | Mayerbock et al. | |
| 7,540,478 B2 | 6/2009 | De Fontenay et al. | |
| 7,703,753 B2 | 4/2010 | Siemer et al. | |
| 8,714,074 B2 * | 5/2014 | Eiletz | F16F 9/56 |
| | | | 92/18 |
| 2006/0071379 A1 | 4/2006 | Kato et al. | |

FOREIGN PATENT DOCUMENTS

| | | |
|---|---|---|
| EP | 0 296 062 A1 | 12/1988 |
| EP | 0 304 349 A1 | 2/1989 |
| EP | 0 894 998 A1 | 2/1999 |
| EP | 1 348 885 A1 | 10/2003 |
| EP | 1 378 682 A1 | 1/2004 |
| EP | 2 672 137 A1 | 12/2013 |
| FR | 2 595 426 A2 | 9/1987 |
| FR | 2 618 508 A1 | 1/1989 |
| FR | 2 730 537 A1 | 8/1996 |
| FR | 2 830 911 A1 | 4/2003 |
| FR | 2 853 380 A1 | 10/2004 |
| FR | 2 817 007 B1 | 5/2005 |
| FR | 2 923 881 A1 | 5/2009 |
| FR | 2 926 864 A1 | 7/2009 |
| GB | 2 316 731 A | 3/1998 |
| JP | S 561 43 830 A | 11/1981 |
| JP | S60 121339 A | 6/1985 |
| JP | H04 102741 A | 4/1992 |
| WO | 95/30843 A1 | 11/1995 |
| WO | 96/14520 A1 | 5/1996 |
| WO | 2008/071885 A2 | 6/2008 |

\* cited by examiner

HYDROELASTIC DEVICE COMPRISING A LOCKING SYSTEM

BACKGROUND OF THE INVENTION

Field of the Invention

The invention concerns the field of hydroelastic devices and relates to means for overcoming the loss of damping liquid during filling. Such a hydroelastic device, intended to be mounted on a machine, fixed to two elements, to assemble them and ensure a transmission of forces from one to the other and to dampen or filter vibrations between them, is for example used in a vehicle (train, car . . . ) for ground connection. The term "hydroelastic device" should be considered analogous to "hydraulic anti-vibration support", "hydraulic anti-vibration sleeve", "hydromount" or, in English, "bushing" or "fluid-filled elastic mount".

Description of the Related Art

A hydroelastic device of the type to which the invention can be applied comprises, in a known manner, solid elements of force transmission including an internal reinforcement and an external reinforcement spaced apart, delimiting an in-between, as well as a damping body, relatively rigid but elastically deformable, disposed in the in-between and associated with both reinforcements, and a damping space including at least one damping chamber, associated with the damping body. Normally, the damping space is filled with a pressurized damping liquid, which corresponds to a state known as the "filling state". This damping liquid is suitable and intended to be moved in the damping space following what is referred to here by ellipse as "reinforcement stress", which is the exertion on one of the reinforcements in relation to the other of a force in a stress direction, referred to by ellipse as "device stress direction", so as to damp or filter vibrations. Depending on the construction, the damping space includes one, two or more damping chambers. A connective damping channel, long and narrow, typically connects several damping chambers.

In the case where the hydroelastic device is a joint (see FR 2 817 007), the outer reinforcement laterally and concentrically surrounds the inner reinforcement and the in-between is annular. The hydroelastic joint has a main axis and is located between two transverse end faces, the internal reinforcement emerging from at least one of them in order to be assembled to one of the two elements, while the external reinforcement can be associated to the other of the two elements. In one type of embodiment, the hydroelastic joint comprises a rigid inner reinforcement of generally cylindrical shape; a rigid outer reinforcement of generally cylindrical tubular shape of greater inner diameter than the outer diameter of the inner reinforcement, laterally and concentrically surrounded by the outer reinforcement; and a radially and axially extending annular cylindrical in-between interposed between the two radially spaced reinforcements; a damping body, comprising a shaped mass of elastomer, rubber or the like, disposed in the in-between, extending radially and axially, and fixedly and rigidly associated inwardly with the inner reinforcement and outwardly with the outer reinforcement; two damping chambers, provided by the design of the damping body, extending radially and axially, diametrically opposed, interposed between the damping body and the external reinforcement; an elongated and narrow damping channel connecting the two damping chambers in a communicating manner; and a relatively low viscosity damping liquid, filling under pressure the damping space formed by the two damping chambers and the damping channel.

"Cylindrical shape" means a shape obtained by moving a generator which, in whole or in part, is generally rectilinear or pseudo-rectilinear along a closed, generally circular or pseudo-circular or rounded or polygonal reference curve.

With such a hydroelastic joint, a relative radial force on one frame relative to the other compresses one of the damping chambers and expands the other, with damping liquid being displaced from the compressed damping chamber to the expanded damping chamber as it flows through the channel. This stress on the reinforcements occurs at a certain frequency in correspondence with the resonance frequency of the liquid mass passing through the damping channel, which induces the cross section and length of the channel. Such a hydroelastic joint is in a state of low stiffness at low frequency and in a state of high stiffness above a given frequency. This is how the vibrations are dampened or filtered.

Many particular configurations of such a hydroelastic joint are known: FR 2 595 426 (two connecting channels), FR 2 618 508 (two chambers and two ducts), FR 2 830 911 (two damping bodies, one in-between reinforcement), FR 2 853 380 (four chambers), FR 2 926 864 (two coupled joints), EP 0 304 349 (second sealable connecting channel), EP 1 348 885 (C in-between reinforcement), EP 1 378 682, U.S. Pat. No. 3,698,703 and GB 2 316 731. JP 04 102741 provides a locking body that can come to rest against the internal reinforcement in the event of radial loading to limit displacement. WO 2008/071885 provides a cylindrical intermediate reinforcement included in the damping body, provided with two blocking bodies located in two cavities forming the damping chamber, capable of transmitting a support force from the internal reinforcement to the external reinforcement in the event of relative radial displacement of an amplitude greater than a predefined limit. U.S. Pat. No. 5,024,425 and FR 2 830 911 describe a damping body provided with stop buffers. U.S. Pat. No. 4,899,997 describes a two-chamber hydroelastic joint with a pre-loaded column, made of deformable material, which can be flattened to compensate for static radial deflections. Whatever the configuration, the damping space must be sealed and tight so that there is no loss of liquid, which would be likely to compromise the proper functioning in a more or less serious, or even dangerous, way. Such sealing and tightness are referred to in FR 2 730 537 (sealing flange), EP 0 234 966 (two-piece assembly), JP S 561 43 830 (sealing gasket), EP 0 296 062, U.S. Pat. No. 3,642,268 (automatic closing of the injection hole for the damping liquid), EP 0 894 998. However, none of these documents propose a solution to compensate for the loss of damping liquid, which corresponds to a state known as "loss of filling state", whereas it has the effect that the hydroelastic device is in a state of low stiffness, which does not guarantee a stable behaviour. The expression "loss of filling" must be understood as meaning the loss of damping liquid from the damping space that is no longer filled with this liquid. The state of the art also includes DE 196 51 138, U.S. Pat. No. 4,875,664, JP S60 121339, US 2006/071379, EP 2 672 137, U.S. Pat. Nos. 4,741,521, 5,123,634, 6,168,144, WO 96/14520 and FR 2 923 881, but none offers a solution to compensate for the loss of damping liquid. This is also the case with WO 95/30843, which reports the problem of the loss of the damping liquid, but only notes that in this case, the damping body continues to perform its function.

SUMMARY OF THE INVENTION

The purpose of the invention is therefore to compensate, to a certain extent, for a failure of sealing and sealing and therefore a loss of damping liquid and its consequences for a hydroelastic device, in particular a hydroelastic joint. And the invention provides for the integration into the device, in addition, of palliative means of loss of filling, which are means with a locking part and a load controlled by the state of the device with regard to filling. These means are palliative because they mitigate or eliminate the consequences in terms of damping that would otherwise result from a loss of damping fluid. These means are specific and proprietary, because they have as an original and exclusive characteristic to compensate for the loss of filling.

According to a first aspect, the invention concerns a hydroelastic device of the kind previously described, comprising solid elements of force transmission including an internal reinforcement and an external reinforcement delimiting an in-between, as well as a damping body, relatively rigid but elastically deformable, disposed in the in-between and associated with the two reinforcements, and a damping space including at least one damping chamber and associated with the damping body. The device is normally in a filling state where the damping space is filled with a pressurized damping liquid suitable and intended to be moved in the damping space after exercising a force on one of the reinforcements relative to the other in a loading direction of the device, so as to dampen or filter the vibrations. The device may accidentally be in a loss of filling state where the damping space is no longer filled with the pressurized damping liquid. The device also includes integrated, specific and proprietary means, palliative of the loss of filling, inactive in the state of filling and made active in the state of loss of filling where they bring the device to a state of stiffness of a high level so that it exhibits a stable behaviour, although the damping space is not filled with the damping liquid under pressure, these palliative means comprising a locking system including a fully rigid locking part and a deformable load part controlled by the state of the device with regard to filling.

The integrated palliative means comprise a self-supporting locking system carried by the hydroelastic device, integrating, combining and uniting a load part and a locking part, with the load part carried by and secured to a solid force transmission element of the hydroelastic device and the locking part carried by and secured to the load part, located in a damping chamber, suitable and intended to be inactive in the filled state and made active in the lost filled state, such as the locking part, which is completely rigid, and which is suitable and intended, on the one hand, to be movable by the locking part in a load direction of the locking part, and on the other hand, to occupy two extreme positions, an inactive position in the filling state, in which the locking part ensures a discontinuity of force transmission in the loading direction of the hydroelastic device, not being locked in the loading direction of the hydroelastic device and an active position in the loss of filling state, wherein the locking part, being locked in the load direction of the hydroelastic device, provides a force transmission continuity in the load direction of the hydroelastic device and adds additional stiffness in that direction, and such that the load part is deformable between a compressed state and a state deployed and controlled by the state of the hydroelastic device, so that it is in the compressed state when the hydroelastic device is in the filled state, in the deployed state when the hydroelastic device is in the loss of filling state, when it is deformed from the compressed state to the deployed state when changing from the filling state to the loss of filling state, and that it is adapted and intended to load the locking part to move it in the direction of load of the locking part, from an inactive position to the active position when changing from the compressed to the extended state and to keep it in the active position as long as the load part is in the extended state.

The load part can be controlled by the state of the device such that it is changed from the deployed state to the compressed state during the changing from the unfilled state to the filled state, being suitable and intended to act upon the locking part in order to move it from its active position to an inactive position during its changing from the deployed state to the compressed state.

The load part may comprise a support and attachment part to a solid force transmission element of the hydroelastic device, a support and attachment part of the locking member, and, connecting these two support and attachment parts, at least one elongated self-supporting and deformable part controlled by the state of the hydroelastic device so as to be deformed between its two states, the support and attachment part of the locking member being moved in the direction of load of the locking member.

The deformable part of the load part, made out of a deformable material, has one or more hollow internal spaces, without communication with the outside of the load part, in which there is a pressure which, on one hand, is smaller than the pressure of the damping liquid of the hydroelastic device in the full state and is greater than or equal to atmospheric pressure. The deformable part of the load part is either compressed when the device is in the filled state, the pressure in the internal hollow spaces being lower than the pressure of the damping liquid of the device, so that the damping liquid compresses the deformable elongated part, or deployed when the device is in the state of loss of filling, the pressure in the internal hollow spaces being greater than or equal to the atmospheric pressure in the damping chamber due to the loss of damping liquid. The deformable part is formed such that during the change from the full state to the unfilled state, the support and attachment part of the locking part on the load part is moved in the load direction of the locking part. The load part may comprise an deformable part in the form of two arms inclined on one another, on one hand, converging towards the part for support and attachment to a solid force transmission element of the device on the load part, and on the other hand, diverging towards the part for support and attachment of the locking part, a double support and attachment part of the locking part being also present on the load part.

The support and attachment part of the device to a solid force transmission element can be carried by a support bracket projecting from the face of the damping body.

The lateral surface of the locking part may have at least one clearance area which, in the inactive position of the locking part, is situated in the direction of force of the device by being spaced apart and without contact of at least one corresponding facing clearance area belonging to or attached to the interior lateral surface of the damping chamber so as to ensure the discontinuity of the transmission of force in direction of force of the device. The locking part may have either a single clearance area or two opposite clearance areas, with either a single opposite clearance area or two opposite opposite clearance areas, respectively. A facing clearance area may be an area of the lateral surface of a reinforcement or the damping body turned towards the damping chamber or an area of an engagement stop in the damping chamber.

The lateral surface of the locking part may have at least one area of engagement which, in the active position of the locking part, is situated in the load direction of the device by being in contact with the transmission of force of at least one contiguous area of engagement belonging to or attached to the interior lateral surface of the damping chamber, so as to ensure the continuity of the transmission of force in the load direction of the device. The locking part may have either a single engagement area or two opposing engagement areas, with either a single contiguous engagement area or two contiguous engagement areas, respectively.

An area of contiguous engagement belonging to or attached to the interior lateral surface of the damping chamber may be an area of the lateral surface of a reinforcement or of the damping body turned towards the damping chamber or an area of an engagement stop formed in the damping chamber.

The lateral surface of the locking part may have a clearance area and an engagement area which are adjacent or neighbouring, or have an adjacent or neighbouring clearance area and engagement area and which extend over a length corresponding to the course of the displacement of the locking part between its extreme active and inactive positions.

The lateral surface of the locking part may have a holding/force area firmly associated to a corresponding area of holding/force belonging to the load part, so as to ensure on one hand the maintaining of the locking part in the active position or in the inactive position according to whether the force piece is in the compressed state or in the deployed state, and on the other hand, the movement of the locking part, in the direction of force of the locking part, from an inactive position to the active position during the changing of the load part from the compressed state to the deployed state.

The lateral surface of the locking part may have in the holding/force area a support and attachment part complementary to the support and attachment part of the locking part present on the load part in the corresponding holding/force area. In particular, the lateral surface may have a double support and attachment part complementary to a double support and attachment part of the locking part, these double support and attachment parts being spaced apart and arranged along the force direction of the device.

The load direction of the locking part is or comprises a transverse component, particularly one which is perpendicular or nearly perpendicular, with respect to the load direction of the device.

The locking part may have a lateral surface whose contour is of a polygonal or pseudo-polygonal shape or which is formed by an envelope of a polygonal or pseudo-polygonal shape. It may include a part formed with a recess in the general form of an inverted double L, with, on one side, a clearance area and on the other side an engagement area.

The locking part can be hollow and lightweight.

One, two or more damping chambers may be provided, or a plurality of damping chambers, a locking part being provided in all or only part of the damping chambers. The device may comprise a plurality of damping chambers, including at least one pair of damping chambers arranged in the load direction of the device, a locking part being provided in each of the damping chambers of at least one pair of damping chambers.

The device described above may be a hydroelastic joint having a main axis and lying between two transverse end faces, the internal reinforcement emerging from at least one of the end faces for its assembly, in which the internal reinforcement is generally cylindrical, the external reinforcement is generally tubular cylindrical, whose inner diameter is larger than the outer diameter of the inner reinforcement, so that the outer reinforcement laterally and concentrically surrounds the inner reinforcement, the in-between is generally annular cylindrical in shape extending radially and axially between the two reinforcements spaced radially from each other, the damping body extends radially and axially and is fixedly and rigidly associated inwardly with the inner reinforcement and outwardly with the outer reinforcement, two damping chambers are provided by the design of the damping body, extending radially and axially, being diametrically opposed in the load direction of the device, and interposed between the damping body and the external reinforcement, an elongated and narrow damping, connecting channel communicates between the two damping chambers, in the filled state, the hydraulic damping liquid fills under pressure the damping space formed by the two damping chambers and the damping channel, and the load direction of the device is radial. The inner and outer reinforcements and a damping chamber can be generally cylindrical in shape. Each damping chamber is delimited by an interior lateral surface of the damping chamber formed on one side by a part of the damping chamber of the interior surface of the external reinforcement and on the other side by a surface of the damping chamber of the damping body.

Each locking part has a lateral surface in which the contour is of a pseudo-rectangular shape or is enclosed by an envelope of a pseudo-rectangular shape, with a first part of the surface being adjacent to an area of the surface of the damping chamber of the damping body, a second part of the surface, opposite to the first part of the surface situated towards the part of the damping chamber of the interior surface of the external reinforcement, and a third and fourth part of the surface opposite to one another, connecting the first and second surface parts. The second face part may have a shaped part with a generally double L-shaped reverse recess. The clearance area can be located in the middle position on the second face part of the side surface of the locking part. The side surface may have two engagement areas, one located on the first front part and the other in a median position on the second front part and the third side surface part may have the support and attachment part to the load part. The device may include, for each locking part, a facing clearance area belonging to an engagement stop provided in the damping chamber, and more particularly two facing engagement areas, respectively, formed by a part of the damping chamber face of the damping body and belonging to an engagement stop provided in the damping chamber.

The device can be in the filling state, with the locking part in an inactive position, the load part in the compressed state or in the loss of filling state, the locking part in an active position, the load part in the extended state.

According to a second aspect, the invention relates to specific and proprietary means, palliative to the loss of filling of a device as described above, specially suitable and intended to be integrated, in addition, into such a device, these palliative means comprising a locking system including a fully rigid locking part and a deformable load part controlled by the state of the device with respect to filling.

According to a third aspect, the purpose of the invention is to compensate for the loss of filling of a device of the kind previously described, by implementing palliative means for the above-mentioned loss of filling.

DESCRIPTION OF THE PREFERRED EMBODIMENTS

Figure 1:
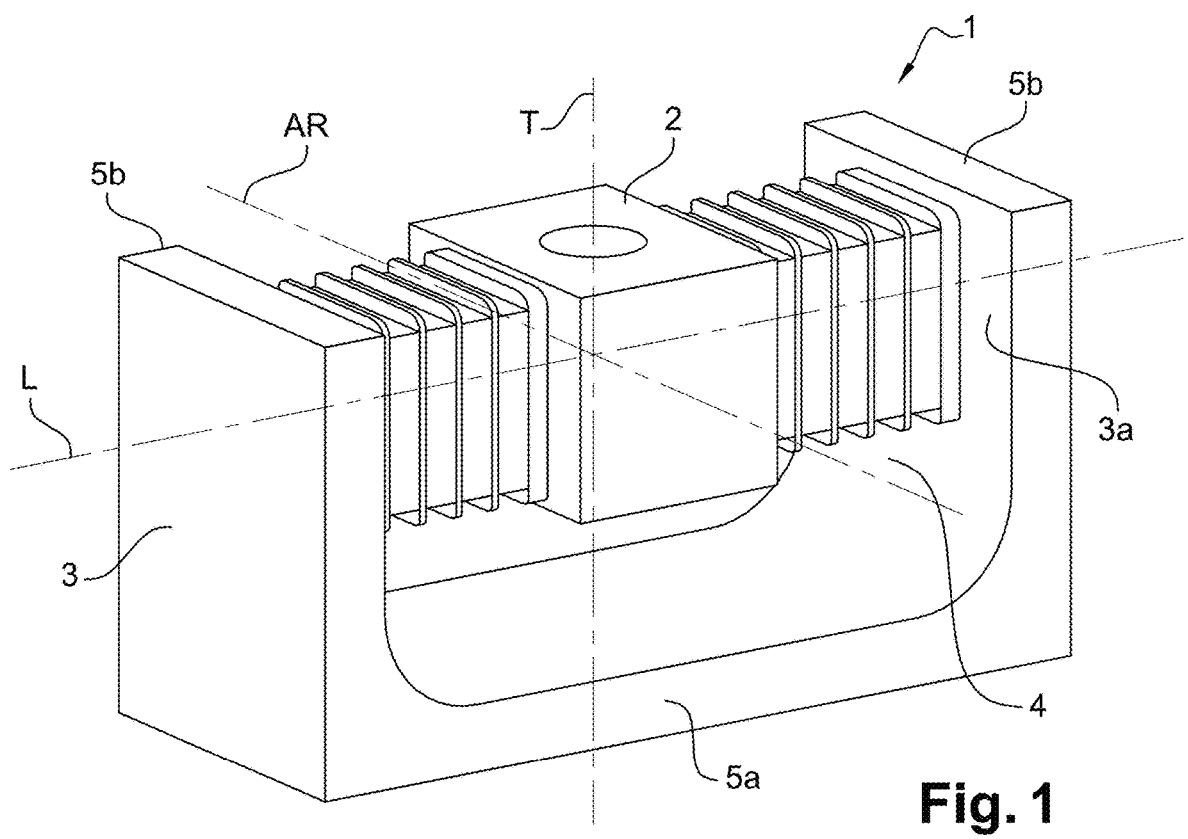
FIG. 1 is a perspective diagram of a possible theoretical embodiment of a hydroelastic device illustrating the kind of one to which the invention can be applied and FIG. 2 is a perspective and cross-sectional diagram by a median axial plane of the device in FIG. 1.
Figure 2:
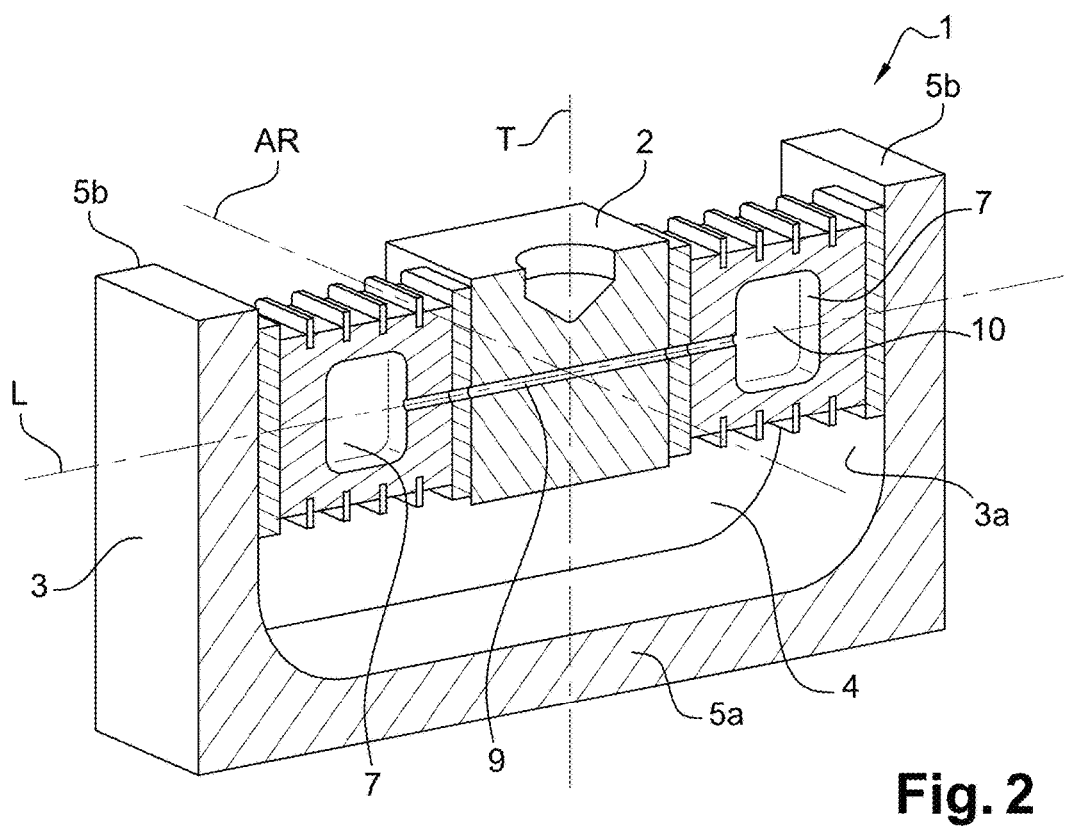

A hydroelastic device 1 illustrating the type of the one to which the invention applies is shown in FIGS. 1 and 2, according to an embodiment that is not exclusive to others. It is part of an outer shell of generally parallelepipedic or pseudo parallelepipedic shape and includes solid force transmission elements including an inner rigid reinforcement 2 and an outer rigid reinforcement 3, an in-between 4 between the two reinforcements 2 and 3 spaced from each other. With reference to the frontal plane of device 1, the internal reinforcement 2 has a general square or rectangular shape in elevation and the external reinforcement 3 has a general U shape with a base 5a extending in a longitudinal direction L and two spaced wings 5b extending in a longitudinal direction T, and between which lies the internal reinforcement 1 which is also spaced from the base 5a. In the longitudinal direction L, the inner dimension of the outer reinforcement 3 is larger than the inner dimension of the inner reinforcement 2, the outer reinforcement 3 surrounding the inner reinforcement 2. The in-between 4 has a general U shape. The front plane is parallel to the longitudinal direction L and to the longitudinal direction T and device 1 extends along the front-rear direction perpendicular to the front plane. Device 1 also comprises two damping bodies 6, relatively rigid but elastically deformable, comprising a shaped mass of elastomer, rubber or the like, each fitted in an outer shell of generally parallelepiped or pseudo parallelepiped shape, arranged in between 4 and extending in the longitudinal direction L, being associated, in a fixed and rigid manner towards the inside with the inner reinforcement 1 and towards the outside with both wings 5b of the outer reinforcement 2. Two separate and distinct damping chambers 7 are provided in the two damping bodies 6 designed for this purpose, each limited in particular by an inner side surface 8. The two damping chambers 7 are deformable like the two damping bodies 6. They extend in the longitudinal directions L and T and in the rear direction. They are symmetrically opposite to the transverse centreline of device 1 and are connected in a communicating manner by a long and narrow damping channel 9, which connects them. A relatively low-viscosity damping liquid 10 fills under pressure the damping space 7+9 formed by the damping chambers 7 and damping channel 9. The damping liquid 10 is moved in the damping space 7+9 consecutively to the exercise on one of the reinforcements 2, 3, with respect to the other reinforcement 3, 2, of a force in a load direction F of the device 1, so as to damp or filter the vibrations. Device 1 is normally in the filling state in which the damping space 7+9 is filled with damping liquid 10. However, it can accidentally, for example due to a leak, switch to the state of loss of filling where the 7+9 damping space is no longer filled with damping liquid.

A detailed description of several embodiments of the invention illustrated by examples and referring to the drawings is given hereunder.

The different embodiments of a device 1 may include means conventionally referred to as "palliative means of loss of filling 11" or by ellipse, "palliative means 11". These palliative means 11 are automatically operated and, in the event of loss of damping liquid in the 7+9 damping space, they bring device 1 to a state of high stiffness such that it exhibits a stable behaviour. These palliative means 11 are with a locking part and a load controlled by the state of device 1 with regard to filling. These palliative means 11 mitigate or eliminate the consequences in terms of damping that would otherwise result from a loss of damping fluid. These palliative means 11 are specific and proprietary, as their original and exclusive characteristic consists in compensating for the loss of filling. Consequently, these means 11 are distinct from both the damping body 6 and the damping liquid 10 filling the damping space.

Figure 3:
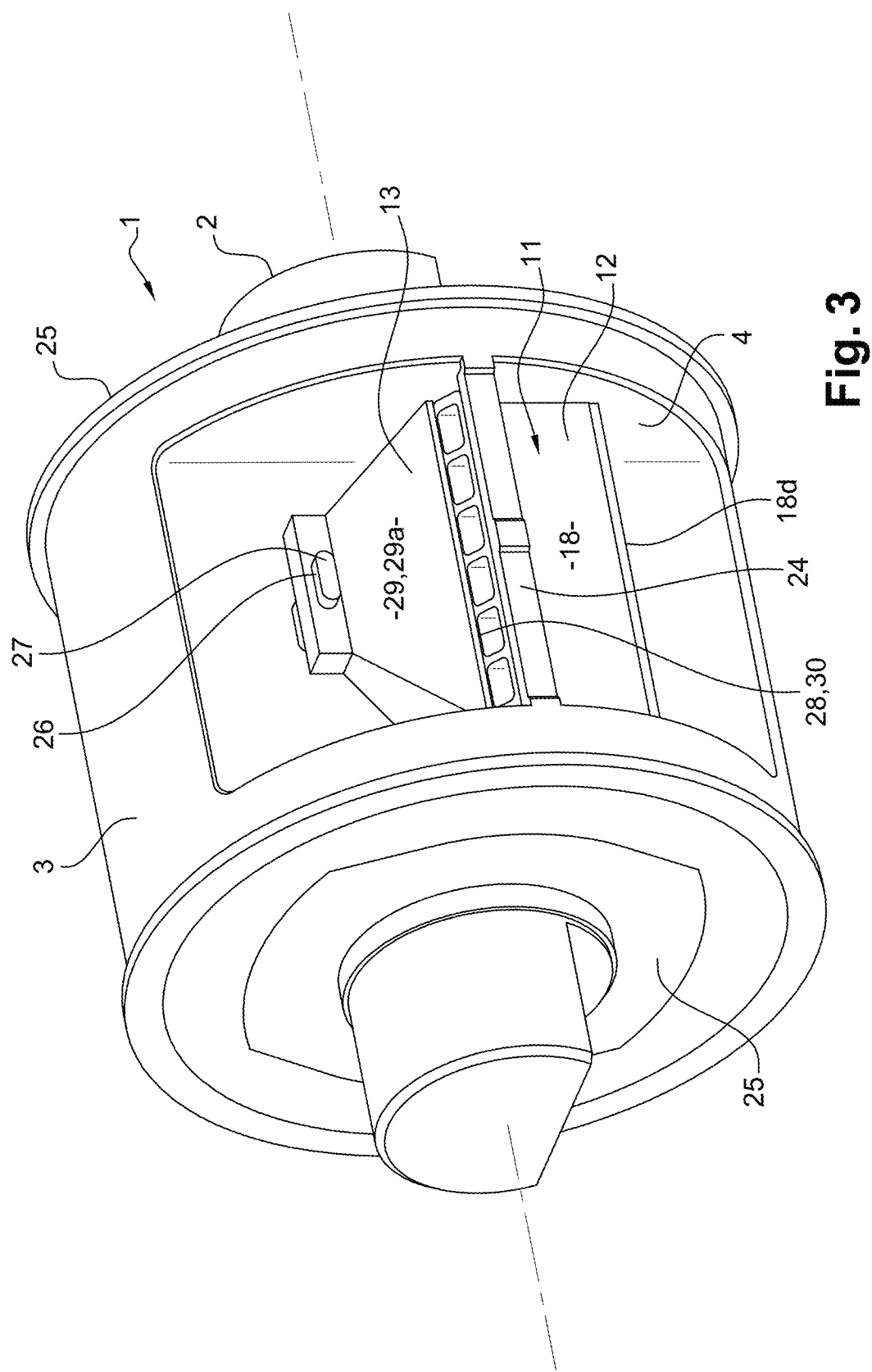
FIG. 3 is a partially ripped perspective view of a hydroelastic joint according to a possible embodiment of the invention, in which palliative means of loss of filling—shown in the figure—are integrated.
Figure 4:
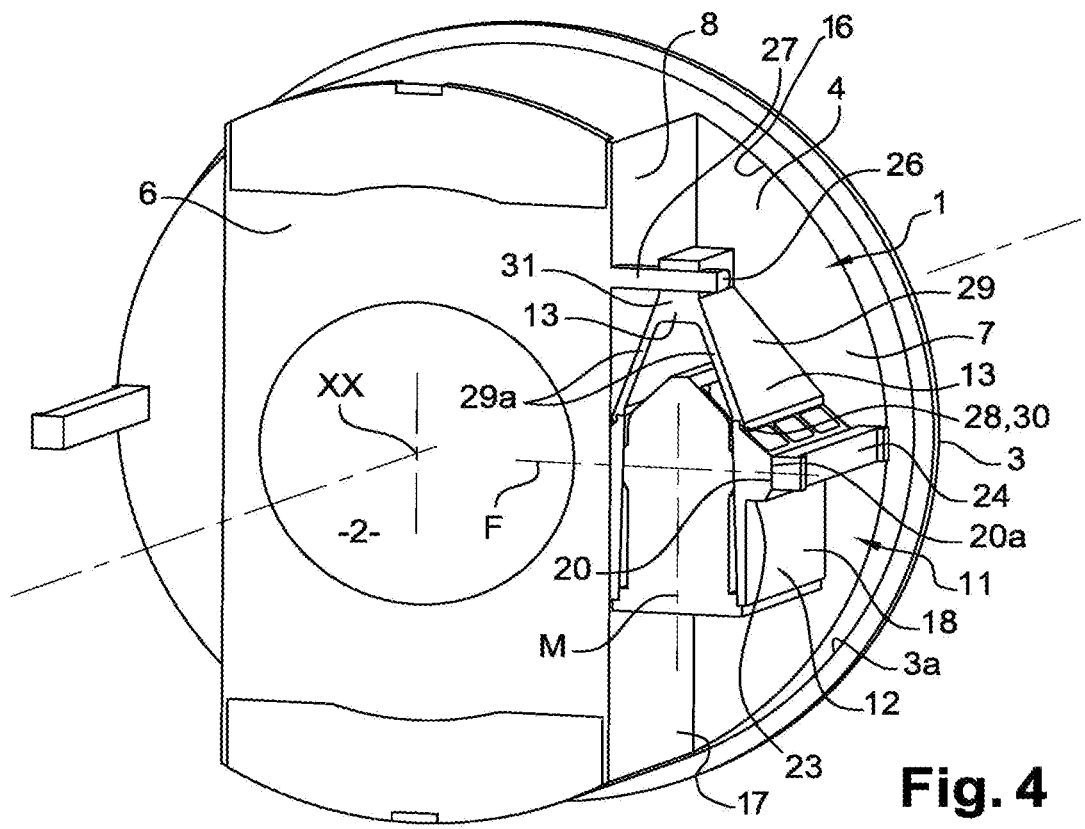
FIG. 4 is a cross-sectional view of the hydroelastic joint while there was no loss of damping liquid and FIG. 5 is a similar view of the hydroelastic joint while there was accidental loss of damping liquid.
Figure 5:
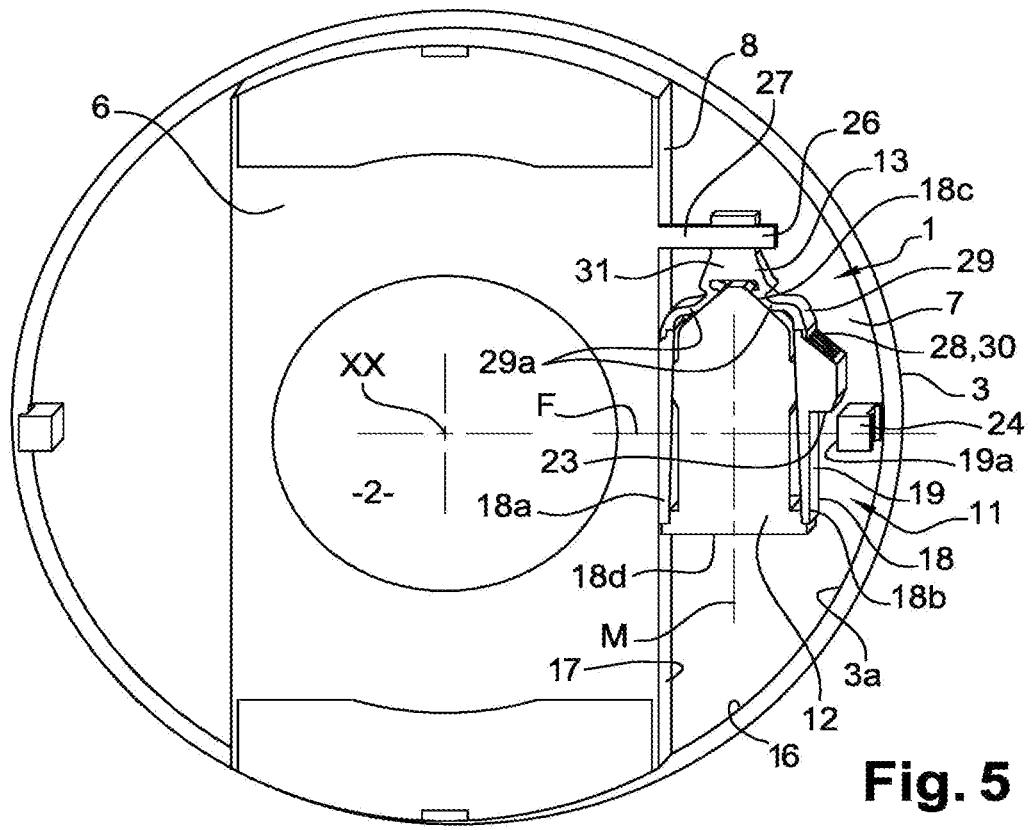

Such palliative means of loss of filling 11 are described in reference to FIGS. 3 to 5, representing a device 1 which is a hydroelastic joint.

Such palliative means of loss of filling 11 are described with reference to FIGS. 3 to 5, in an integrated embodiment, in which device 1 is a hydrostatic joint. For simplicity, reference 1 is used for both a device according to FIGS. 1 and 2 and a hydrostatic joint (FIGS. 3 to 5). More generally, the same references as those previously used for similar parts and means have been retained. The particular embodiment relating to the hydroelastic joint of FIGS. 3 to 5 is not restrictive, others can be considered, it being possible to transpose and adapt the characteristics of palliative means 11 if necessary.

Hydraulic joint 1 has a main axis XX, for example vertical, and is located between two transverse end faces 25. The inner reinforcement 2 emerges from at least one of the end faces 25 to allow its assembly (and in FIG. 3, of the two end faces 25). The internal reinforcement 2 has a general cylindrical form with an axis XX. The external reinforcement 3 has a general cylindrical tubular form with an axis XX. Its interior diameter is larger than the exterior diameter of the internal reinforcement, such that the external reinforcement laterally and concentrically surround the internal reinforcement. The in-between 4 is of a general annular cylindrical shape extending radially and axially between the two reinforcements 2 and 3 spaced radially from one another. "Axial" means in the direction of the XX axis and "radial", orthogonal to—and through—the XX axis.

The damping body 6 extends radially and axially. It is attached in a fixed and rigid manner to the inside of the internal reinforcement 2 and to the outside of the external reinforcement 3. Hydraulic joint 1 has two similar damping chambers 7 and therefore only one and the associated organs are described. The two damping chambers 7 are formed first by the design of the damping body 6, extending radially and axially and being diametrically opposed to each other symmetrically with respect to the XX axis in the F direction, which is here a radial direction. Then, the two damping chambers 7 are interposed between the damping body and the external reinforcement 3. Each of the two damping chambers 7 is generally cylindrical in shape and limited by a face 8 called the inner side surface 8 of the chamber. The inner side surface 8 of the chamber is formed on a first side by a part 16 of the inner face 3a of the outer reinforcement 3, conventionally referred to as "chamber part 16 of the inner face 3a of the outer reinforcement 3". The chamber part 16 of the inner face 3a of the outer reinforcement 3 has a cylindrical arc shape. The inner side surface 8 of the chamber is formed on a second side by a face 17 of the damping body 6, conventionally referred to as "chamber face 17 of the damping body 6". The chamber face 17 of the damping body 6 has a generally flat shape.

Two damping chambers are provided. But this embodiment is not restrictive and exclusive of others, as a device 1 may have one, two or more damping chambers. As in the case of the embodiment of FIGS. 1 and 2, a long and narrow damping channel (not shown here) is provided, which connects the two damping chambers 7 in a communicating way.

In the full state, the hydraulic damping liquid 10 having a relatively low viscosity fills under pressure the damping space 7+9 formed by the two damping chambers 7 and the damping channel. Since device 1 may accidentally be in a state of loss of filling, it is further provided that the palliative means of loss of filling 11, integrated into device 1, are incorporated into it—in particular during manufacturing— forming with it a coherent, automatically operating, specific and proprietary whole.

Palliative means 11 are inactive at the state of filling. They are made active in the state of loss of filling and then bring device 1 to a state of high stiffness such that it exhibits a stable behaviour, although the 7+9 damping space is not filled with the damping fluid under pressure.

The invention concerns device 1, in particular the hydroelastic joint 1, with its palliative means 11, and the process to compensate for the loss of filling of such a device 1. It concerns device 1 in the state of filling or in the state of loss of filling, assembled and ready for use, or disassembled in whole or in part.

Palliative means 11 include a blocking system (which when confused with palliative means 11) may also take reference 11. This locking system 11 is especially suitable and intended to be integrated into device 1. It integrates, combines and unites a fully rigid locking part 12, with a side surface 18, and a generally self-supporting and deformable load bearing part 13.

Load part 13 comprises a support part 26 and attachment to a solid force transmission element 27 of device 1 and a support and attachment part 28 of locking part 12. Finally, it includes at least one self-supporting and deformable part 29 connecting these two support and attachment parts 26 and 28.

The locking system 11 is self-supporting and is supported by device 1, i.e. the solid transmission element of force 27 which, in the embodiment shown, is a support appendix provided on the damping body 6 by projecting from its lateral face 17 which is part of the inner lateral face 8 of the damping chamber 7, and which is called the chamber face 17 of the damping body 6. The term "self-supporting" must be understood as meaning that the locking system 11, supported by device 1, and the locking part 12 which is part of it, remain in place and have an overall hold, due to its very constitution.

On its side surface 18, the locking part 12 has a support and attachment part 30, complementary to the support and attachment part 28 provided on the load part 13. Thus, locking part 12 is carried by and secured to load part 13.

The locking system 11, located in a damping chamber 7, is suitable and intended to be inactive during the filling state and rendered active during the loss of filling state.

The process to compensate for the loss of filling is therefore carried out by the palliative means 11 integrated into device 1, with the locking part 12 and the load part 13 itself including the deformable elongated part 29.

Since two damping chambers 7 are provided, there are two locking systems 11. Where there is a plurality of damping chambers 7, depending on the embodiment, either a locking system 11 is provided in all damping chambers 7 or a locking system 11 in only part of the chambers 7. In addition, when, as in the embodiment of FIGS. 3 to 5, there is a plurality of damping chambers 7 with a pair of damping chambers 7 arranged in the F direction, there is a locking system 11 in each of the damping chambers 7.

Clamping part 12 and load part 13 are separate parts rigidly joined together by means of the support and attachment part 28 provided on the load part 13 and the support and attachment part 30 provided on the locking part 12, these two support and attachment parts 28 and 30 being complementary to each other and rigidly joined together. However, in other possible embodiments, the locking part 12 and the load part 13 form a one-piece unit 12+13 from production. In this case, the two support and attachment parts 27 and 30 are not individualized but form the interface between part 12 (locking) and part 13 (load) of the one-piece assembly 12+13. This is how the terms "locking part 12", "load part 13", "support and attachment part" 28 and 30 must be understood and interpreted. Thus, the terms "locking part 12", "load-bearing part 13", "support and attachment part" 26, 28, 30, "solid transmission element 27", "appendix", "self-supporting and deformable part 29" are used in a conventional way, without being in themselves restrictive, the structural and functional characteristics of these means being described below in several possible but not exclusive embodiments of other functionally equivalent ones.

The locking part 12, fully rigid to accommodate and transmit the forces applied to device 1, can be lightweight, not needing to be heavy since it is carried by the load part 13. According to an embodiment, the locking part 12 is hollow. The locking part (12) is located in the damping chamber 7 where it is suitable to and intended for, on one hand, displacement by a load part 13 in one load direction M of the locking part, and on the other hand, to occupy two extreme positions, i.e. on the one hand, an inactive position, and on the other hand, an active position. The expression "inactive position" must be understood as meaning that in this position the locking part 12 does not perform the locking function of the palliative means 11. Conversely, the expression "active position" must be understood as meaning that in this position the locking part 12 performs the locking function of the palliative means 11.

Locking part 12 is in its inactive position in the filling state. In the inactive position, it provides a force transmission discontinuity in the load direction F of the hydroelastic joint 1. Indeed, the locking part 12 is not locked in the F direction. Locking part 12 is in its active position in the loss of filling state. In the active position, it ensures a continuous force transmission in the F direction and adds additional stiffness in that direction. Indeed, the locking part 12 is then locked in the F direction. These are the functions provided by locking part 12 in the inactive and active positions, respectively.

The side surface 18 of locking part 12 has functional areas that functionally cooperate with corresponding functional areas of device 1, including palliative means 11. These functional areas are conventionally designated as follows: clearance area 19, engagement area 20, holding/loading area. The term "clearance" is to be understood as meaning that area 19 is suitable and intended to be cleared, i.e. free and unhindered. The term "engagement" must be understood as meaning that area 20 is capable and intended to interfere with an organ, with contact and transmission of force. The term "holding/load" must be understood as meaning that the corresponding area is suitable and intended for holding and loading the locking part 12.

The locking part 12 has a lateral face 18 whose contour is part of an envelope of a generally pseudo-rectangular shape. This embodiment is not restrictive and exclusive of others, it being possible for the locking part 12 to present a lateral surface 18 whose contour is, more generally, of a polygonal or pseudo-polygonal shape or which is formed by an envelope of a polygonal or pseudo-polygonal shape.

The side surface 18 of the locking part 12 has, on the one hand, a first face part 18a and a second face part 18b, opposite each other. It also includes, on the other hand, a third face part 18c and a fourth face part 18d, opposed to each other, connecting the first and second face parts 18a and 18b. The second face part 18b has a shaped part with a generally double L-shaped reverse recess 23. The first face part 18a is adjacent to an area of the chamber face 17 of the damping body 6. The second face part 18b is located towards the chamber part 16 of face 3a of the external reinforcement 3.

Locking part 12 has a clearance area 19 located in a median position on its second face part 18b, two engagement areas 20, one located on the first face part 18a and the other located in a median position on the second face part 18b, a holding/loading area located on one of the two face parts 18a and 18c, corresponding to the support and attachment part 30 provided on the locking part 12, which is complementary to the support and attachment part 28 provided on the load part 13, the two support and attachment parts 28 and 30 being rigidly joined together. As soon as both functions are fulfilled, locking part 12 can be used for other purposes than those described.

Load part 13, more precisely the deformable elongated part 29, is deformable between a compressed and an expanded state and is designed and arranged for this purpose. It is controlled by the state of device 1, with respect to filling, as follows: it is in the compressed state when device 1 is in the filled state, it is in the deployed state when device 1 is in the loss of filling state, and it is deformed from the compressed state to the deployed state when changing from the filled state to the loss of filling state.

Load part 13, more particularly the deformable elongated part 29, is suitable and intended to load the locking part 12 in order to move it, in the direction M of load of the locking part, from an inactive position to the active position when changing from the compressed to the extended state, and to keep it in the active position as long as the load part 13 is in the extended state. As soon as the functions are fulfilled, the load part 13 can be the subject of embodiments other than those described.

The load part 13 is controlled by the state of the hydroelastic joint 1 in such a way that it can be changed from the extended state to the compressed state when changing from the loss of filling state to the filling state. It is then able and intended in addition to loading the locking part 12 to move it from its active position to an inactive position when the load part 13 changes from the deployed state to the compressed state. The self-supporting and deformable part 29 can be the subject of different design variants, all of which perform the functions of being in the deployed or compressed state, or of switching from one to the other depending on the state of the device with regard to filling. The term "part", relating to part 29, is to be understood as meaning that part 29 is an element of load part 13, in addition to the support and attachment part 26 and the support and attachment part 30. According to an embodiment, parts 29, 26 and 30 form a one-piece unit that has been manufactured. In other embodiments, they may be separate elements assembled together. The self-supporting and deformable part itself can, depending on the case, be a one-piece or a composite unit. The term "elongated" is to be understood as meaning that part 29 extends in length in the load direction M of the locking part, at least in its extended state. This does not mean that part 29 necessarily extends only in direction M, but that it can be "decomposed" with a component in direction M and another component in a perpendicular direction, such as direction F. Being thus extended in length in the load direction M of the locking part, at least in its deployed state, the self-supporting and deformable part 29 can have a compressed state. The term "self-supporting" must be understood (like locking system 11 and its load part 13) as meaning that part 29, supported by device 1 by the support and attachment part 26 provided on load part 13 and support appendix 27, remains in place and has an overall hold, due to its very construction. The term "deformable" is to be understood as meaning that part 29 can be modified in shape, more precisely that its length extension in direction M can be modified, with a higher value in the deployed state and a lower value in the compressed state. This deformation is at least an extension of the self-supporting and deformable part 29 from the compressed state to the expanded state. In a design where the self-supporting and deformable part 29 is elastically deformable, the deformation can also be a contraction causing part 29 in the deployed state to move to the compressed state. In any case, the length extension in load direction M of the locking part is not exclusive of other shape modifications of part 29.

The characteristic according to which the elongated part 29 is self-supporting and deformable can be obtained by different embodiments. Depending on the case, all or almost all of part 29 is deformable, or only one or more determined and chosen areas of it are deformable, while the other areas are not substantially deformable. Depending on the case, the deformation is homogeneous for all or almost all of part 29, or it is differentiated according to one or more areas determined and chosen from part 29, some areas being more deformable and others less so. These achievements make it possible to give part 29 the optimal shapes chosen, in the compressed or deployed state. The elongated part 29 can be made of a deformable material, or include a deformable material, such as an elastomer. The characteristics of this material, the structural, shape and dimensional characteristics of part 29, and more generally its construction characteristics are chosen so that part 29 is self-supporting. In another embodiment, the elongated part 29 is arranged in a manner similar to a telescopic structure. These embodiments are not exclusive of others in order to perform the same functions. The term "compressed", qualifying a state of part 29 (such as the load part 13 of which it forms part), must be understood as meaning that part 29, then of smaller volume, has a smaller extension in the load direction M of locking part and the term "deployed" as meaning that part 29, then of larger volume, has a larger extension in direction M. In a non-exclusive design, the volume, smaller in the compressed state or larger in the expanded state, results from the pressure difference between the outside and inside of part 29 which has one or more internal hollow spaces, without communication with the outside of the load part 13, in which a pressure prevails which, on the one hand, is lower than the pressure of the damping liquid 10 of device 1 in the filled state and, on the other hand, is greater than or equal to the atmospheric pressure. For example, part 29 may have a closed hollow tube shape or include a material with cells not communicating with the outside. With such a design, part 29 is compressed in the state of filling, because the pressure in the internal hollow spaces is lower than the pressure of the damping liquid 10 which compresses the elongated deformable part 29 which cannot provide resistance to prevent this compression. Alternatively, part 29 is deployed in the loss of filling state, as the pressure in the one or more hollow internal spaces is greater than or equal to the atmospheric pressure inside the damping chamber 7 due to the loss of the damping liquid 10. Consequently, the pressure existing in part 29 tends to deploy it and give it a certain overall rigidity. Part 29 is shaped and arranged so that when changing from the state of filling to the state of loss of filling, the support and attachment part 28 of the locking part 12 is moved in the direction M. According to this embodiment, part 29 is deformed by itself, under the influence of the pressure external to it, with respect to the pressure internal to it. This is how the self-supporting and deformable part 29 works.

According to an embodiment, the load part 13 comprises a part 29 in the form of two arms 29a of generally elongated or globally elongated shape, inclined one on top of the other on either side of the load direction M of the locking part. The two arms 29a converge towards the support and attachment part 26 and diverge towards the support and attachment part 28. According to this embodiment, the side surface 18 of the locking part 12 has a double support and attachment part 30 that is complementary to a double support and attachment part 28 provided on the load part 13, on both arms 29a. These double support and attachment parts 28, 30 are spaced apart and located along the load direction F of device 1.

The shape and configuration of part 29 in the compressed state are determined by the very design characteristics and, if applicable, by the design characteristics of the locking part 12. Thus, the locking part 12 can be such that the front part 18a, 18c, where the holding/loading area is located, has two half face parts inclined relative to each other, against which the two arms 29a rest in the compressed state.

In the embodiment with the two arms 29a, part 29 also includes a massive part 31 extending in the load direction M of the locking part and including, on the side opposite the locking part 12, the support and attachment part 26 to appendix 27. The solid part 31 comprises, on the same side as the locking part 12, the support and attachment part 28 which cooperates with the support and attachment part 30, the locking part 12 and the load part 13 being then separate parts rigidly assembled together.

The two support and attachment parts 28 and 30 can have complementary shapes with protrusions and recesses for relative positioning. They can be rigidly joined to each other by gluing, welding or similar.

In the embodiment according to FIGS. 3 to 5, each locking part 12 has an area called conventionally facing clearance 19a belonging to an engagement stop 24 formed in the damping chamber 7. This engagement stop 24 extends parallel to axis XX and is rigidly fixed at both ends to the end faces 25, being located near the inner face 3a of the outer reinforcement 3. This embodiment is not exclusive of others, in which the engagement stop function is realized differently. According to this embodiment, two areas 20a, conventionally referred to as contiguous engagement areas 20a, are provided for each locking part 12, one formed by a part of the chamber face 17 of the damping body 6, the other belonging to the engagement stop 24. For each locking part 12, a holding/loading area is provided, which is the support and attachment part 30 on the locking part 12, which is complementary and rigidly secured to a corresponding holding and loading area of the load part 13 which is for its part the support and attachment part 28 on the load part 13.

These are the functions performed by the opposite clearance area 19a, the adjacent engagement areas 20a, the corresponding holding/loading area in that they functionally cooperate with the clearance areas 19, engagement 20, holding/loading of the locking part 12. As soon as the functions performed by these areas 19a, 20a and the maintenance/load area are fulfilled, device 1 may be the subject of achievements other than those described.

More generally, the lateral surface 18 of the locking part 12 has at least one clearance area 19 which, in the inactive position of the locking part 12, is situated in the direction F by being spaced apart and without contact of at least one corresponding facing clearance area 19a belonging to or attached to the interior lateral surface 8 of the chamber, so as to ensure the discontinuity of the transmission of force in the load direction F of device 1. Depending on the case, either a single clearance area 19 or two opposite clearance areas 19 are provided, with either a single facing clearance area 19a or two opposite facing clearance areas 19a, respectively. Depending on the case, such a facing clearance area 19a belongs to or is attached to the interior lateral surface 8 of the chamber, being an area of the lateral surface of a reinforcement 2, 3 or the damping body 6 turned towards the damping chamber 7 or an area of an engagement stop 24 arranged in the damping chamber 7.

More generally, it is provided that the side surface 18 of the locking part 12 has at least one engagement area 20 which, in the active position of the locking part, is located in the direction F while being in contact with the force transmission of at least one adjacent engagement area 20a belonging to or associated with the inner side surface 8 of the chamber, so as to ensure the continuity of the force transmission in the direction F. Depending on the case, there shall be either a single engagement area 20 or two opposed engagement areas 20, with either a single contiguous engagement area 20a or two contiguous engagement areas 20a, respectively. Depending on the case, an area of contiguous engagement (20a) belonging to or attached to the interior lateral surface 8 of the chamber is an area 20a of the lateral surface of a reinforcement 2, 3 or of the damping body 6 turned towards the damping chamber 7 or an area of an engagement stop 24 formed in the damping chamber 7.

According to embodiments, the lateral surface 18 of the locking part 12 has a clearance area 19 and an engagement area 20 which are adjacent or neighbouring. For example, the lateral surface 18 of the locking part 12 has a clearance area 19 and an engagement area 20 which are adjacent or neighbouring and which extend over a length corresponding to the course of the displacement of the locking part 12 between its extreme active and inactive positions.

Finally, the lateral surface 18 of the locking part 12 has at least one load/holding area which is in displacement contact with at least one corresponding load area belonging to the load part 13 in the direction M in order to ensure the displacement of the locking part 12 in the direction M from an inactive position to the active position during the change of the loading means 13 from a compressed state to the deployed state.

The load direction M of the locking part 12 is or comprises a transverse component, particularly one which is perpendicular or nearly perpendicular, with respect to the direction F Insofar as the load part 13 is self-supporting and carried by appendix 27 to which it is rigidly fixed, where the locking part 12 is rigidly fixed to the load part 13, device 1 can operate with its axis XX in any direction, the compressed or deployed state of the load part 13 being a function of the pressure outside it.

The invention claimed is:

1. A hydroelastic device (1) for attachment to two parts of a machine or piece of equipment, in order to connect said two parts and provide a transmission of forces from one of said parts to an other of said parts, and to dampen or filter vibrations between them, said device comprising:
   solid force transmission elements, including an internal reinforcement (2) and an external reinforcement (3) spaced in a way which delimits a gap (4), and a damping mass (6), which is relatively rigid but elastically deformable, positioned in the gap (4) and connected with the internal and external reinforcements (2, 3); and
   a damping space including at least one damping chamber (7) delimited by an interior lateral surface (8) of the damping chamber (7) formed by surfaces of solid force transmission elements, and attached to the damping mass (6),
   the hydroelastic device (1) being normally in a full state in which the damping space is filled with a pressurized hydraulic damping liquid (10) that is displaceable within the damping space following exertion, on one of the reinforcements (2, 3) in relation to an other of the reinforcements (2, 3), of a force in one direction (F) of loading of the device (1), in order to dampen or filter the vibrations,
   wherein the hydroelastic device (1) can be in an unfilled state where the damping space is no longer filled by the pressurised damping liquid (10), and the hydroelastic device (1) further comprises integrated palliative means (11) for the unfilled state, said palliative means being inactive in the full state and rendered active in the unfilled state wherein the palliative means (11) cause the hydroelastic device (1) to be in a state of heightened stiffness so that the hydroelastic device will exhibit stable behaviour even though the damping space is not filled with the pressurised damping liquid (10), said palliative means (11) comprising a locking system including a fully rigid locking part (12), and a deformable load part (13), controlled by the state of the hydroelastic device with regard to filling.

2. The device (1) according to claim 1, wherein the integrated palliative means (11) comprise a self-supporting locking system (11) carried by the device (1), integrating, associating and uniting a load part (13) and a locking member (12), with the load part (13) carried by and secured to a solid force transmitting element (17) of the device (1) and the locking member (12) carried by and secured to the load part (13), located in a damping chamber (7), configured to be inactive in the filling state and made active in the loss of filling state, such that the fully rigid locking part (12) is configured to be movable by the load part (13) in a direction (M) of loading of the locking part (12), and is configured to occupy two extreme positions: i) an inactive position in the filling state, in which the locking part (12) ensures a force transmission discontinuity in the direction (F) of loading of the device (1), not being locked in the direction (F) of loading of the device (1), and ii) an active position in the state of loss of filling, in which the locking part (12), being locked in the direction (F) of loading of the device (1), ensures a continuity of force transmission in the direction (F) of loading of the device (1) and adds additional stiffness in the direction (F),
   the load part (13) being deformable between a compressed state and a deployed state and controlled by the state of the device (1), so that the load part (13) is in the compressed state when the device (1) is in the filled state, and in the deployed state when the device (1) is in the loss of filling state, so that the load part (13) is deformed from the compressed state to the deployed state when changing from the filling state to the loss of filling state, and so that the load part (13) is configured to load the locking part (12) to move the locking part in the direction (M) of loading of the locking part (12) from an inactive position to the active position when changing from the compressed to the extended state and to keep the locking part (12) in the active position as long as the load part (13) is in the extended state.

3. The device (1) according to claim 2, wherein the load part (13), which is elastically deformable, is controlled by the state of the device (1) such that the load part is changed from the deployed state to the compressed state during the changing from the unfilled state to the full state, and the load part (13) is configured to act upon the locking part (12) in order to move the locking part from the active position to an inactive position during changing from the deployed state to the compressed state.

4. The device (1) according to claim 2, wherein the load part (13) comprises a support and attachment part (26) to a solid force transmission element (27) of the device (1), a support and attachment part (28) of the locking part (12), and, connecting these two support and attachment parts (26, 28), at least one self-supporting and deformable elongated part (29) controlled by the state of the device (1) so as to be deformed between the two states, the support and attachment part (28) of the locking part (12) being moved in the direction (M) of loading of the locking part (12).

5. The device (1) according to claim 4, wherein the self-supporting and deformable part (29) made out of a deformable material, has one or more hollow internal spaces, without communication with the outside of the load part (13), in which there is a pressure which is smaller than the pressure of the damping liquid (10) of the device (1) in the full state and is greater than or equal to atmospheric pressure.

6. The device (1) according to claim 5, wherein the self-supporting and deformable part (29) is either compressed when the device (1) is in the filling state, the pressure in the one or more internal hollow spaces being smaller than the pressure of the damping liquid (10) so that it compresses the self-supporting and deformable part (29), is deployed when the device (1) is in the state of loss of filling, the pressure in the internal cavity or cavities being greater than or equal to the atmospheric pressure in the damping chamber (7) due to the loss of damping liquid (10).

7. The device (1) according to claim 4, wherein the self-supporting and deformable part (29) is formed such that during the change from the full state to the unfilled state, the support and attachment part (28) is moved in the direction (M) of force of the locking part (12).

8. The device (1) according to claim 4, wherein the load part (13) comprises a self-supporting and deformable part (29) in the form of two arms (29a) inclined on one another, converging towards the part for support and attachment (26), and diverging towards the part for support and attachment (28), a double support and attachment part of the locking part (12) being also present.

9. The device (1) according to claim 4, wherein the part for support and attachment (26) is supported by a support appendix (27) projecting from the surface (17) of the damping body (6).

10. The device (1) according to claim 2, wherein a lateral surface (18) of the locking part (12) has at least one area of clearance (19) which, in the inactive position of the locking part (12), is situated in the load direction (F) of the device (1) by being spaced apart and without contact of at least one corresponding facing area of clearance (19a) belonging to or attached to the interior lateral surface (8) of the damping chamber (7) so as to ensure the discontinuity of the transmission of force in the load direction (F) of the device (1).

11. The device (1) according to claim 10, wherein a facing clearance area (19a) belonging to or attached to the interior lateral surface (8) of the damping chamber (7) is an area of a lateral surface of one of the reinforcements (2, 3) or the damping body (6) turned towards the damping chamber (7) or an area of an engagement stop (24) arranged in the damping chamber (7).

12. The device (1) according to claim 2, wherein a lateral surface (18) of the locking part (12) has at least one area of engagement (20) which, in the active position of the locking part (12), is situated in the load direction (F) of the device (1) by being in contact with transmission of force with at least one area of contiguous engagement (20a) belonging to or attached to the interior lateral surface (8) of the damping chamber (7), so as to ensure the continuity of the transmission of force in the load direction (F) of the device (1).

13. The device (1) according to claim 12, wherein an area of contiguous engagement (20a) belonging to or attached to the interior lateral surface (8) of the damping chamber (7) is an area of a lateral surface of one of the reinforcements (2, 3) or of the damping mass (6) turned towards the damping chamber (7) or an area of an engagement stop (24) formed in the damping chamber (7).

14. The device (1) according to claim 2, wherein a lateral surface (18) of the locking part (12) has an corresponding area of holding/force belonging to the load part (13), so as to ensure maintaining of the locking part (12) in the active position or in the inactive position according to whether the force piece (13) is in the compressed state or in the deployed state, and the movement of the locking part (12), in the direction (M) of force of the locking part (12), from an inactive position to the active position during the changing of the load part (13) from the compressed state to the deployed state.

15. The device (1) according to claim 14, wherein the lateral surface (18) of the locking part (12) has, in the holding/load area, a support and attachment part (30) complementary to the support and attachment part (28).

16. The device (1) according to claim 15, wherein the lateral surface (18) of the locking part (12) includes a part formed with a recess (23) in the general form of an inverted double L, with, on one side, a clearance area (19) and on the other side an engagement area (20).

17. The device (1) according to claim 1, having a main axis (XX) and lying between two transverse end faces (25), the internal reinforcement (2) emerging from at least one of the end faces (25), wherein the internal reinforcement (2) is generally cylindrical, the external reinforcement (3) is generally tubular cylindrical with inner diameter that is larger than the outer diameter of the internal reinforcement (2), so that the external reinforcement (3) laterally and concentrically surrounds the internal reinforcement (2), the in-between (4) is generally annular cylindrical in shape extending radially and axially between the internal and external reinforcements (2, 3) spaced radially from each other, the damping body (8) extends radially and axially and is fixedly and rigidly associated inwardly with the internal reinforcement (2) and outwardly with the external reinforcement (3), two damping chambers (7) are provided by the design of the damping body (6), extending radially and axially, being diametrically opposed in the load direction (F) of the device (1), and interposed between the damping body (6) and the external reinforcement (3), an elongated and narrow damping, connecting channel communicates between the two damping chambers (7), in the filled state, the hydraulic damping liquid (10) fills under pressure the damping space formed by the two damping chambers (7) and the damping channel, and the load direction (F) of the device (1) is radial.

18. The device (1) according to claim 17, wherein each damping chamber (7) is delimited by the interior lateral surface (8) of the damping chamber (7) formed on a first side by a part of the damping chamber (7) of the interior surface (3a) of the external reinforcement (3) and on a second side by a surface of the damping chamber (7) by the damping mass (6).

19. The device (1) according to claim 18, wherein each locking part (12) has a lateral surface (18) in which the contour is of a pseudo-rectangular shape or is enclosed by an envelope of a pseudo-rectangular shape, with a first part of the surface (18a) being adjacent to an area of the surface of the damping chamber (7) of the damping mass (6), a second part of the surface (18b), opposing the first part of the surface (18a) situated towards the part of the damping chamber (7) of the interior surface (3a) of the external armature (3), and a third and fourth part of the surface (18c, 18d) opposing one another, connecting the first and second surface parts (18a, 18b).

20. The device (1) according to claim 19, wherein the second face part (18b) of the side surface (18) of each locking part (12) has a portion shaped with a recess (23) generally in the form of an inverted double L, and wherein the clearance area (19) of the side surface (18) is located in a median position on the second face part (18b) of the side surface (18).

21. The device (1) according to claim 19, wherein for each locking part (12), a clearance area (19a) associated with an engagement stop (24) is arranged in the damping chamber (7).

22. Palliative means for the loss of filling (11) of a device according to claim 1, configured to be integrated, in addition, into such a device (1), said palliative means (11) comprising a locking system including a fully rigid locking part (12) and a deformable load part (13) controlled by the state of the device with respect to filling.

23. A method for compensating for the loss of filling of a hydroelastic device (1) by using the palliative means for the loss of filling (11) according to claim 22.

* * * * *